United States Patent [19]

Goto et al.

[11] Patent Number: 4,656,078

[45] Date of Patent: Apr. 7, 1987

[54] KEY TOP WITH AN IDENTIFICATION LEGEND

[75] Inventors: Hideo Goto; Takeo Hosoe; Toshinori Oda, all of Nagoya, Japan

[73] Assignee: Brother Kogyo Kabushiki Kaisha, Aichi, Japan

[21] Appl. No.: 778,744

[22] Filed: Sep. 23, 1985

Related U.S. Application Data

[63] Continuation of Ser. No. 585,226, Feb. 28, 1984, abandoned.

[30] Foreign Application Priority Data

Mar. 18, 1983 [JP] Japan .................................. 58-46620

[51] Int. Cl.[4] .......................... B32B 3/18; B32B 5/16

[52] U.S. Cl. .................................... 428/204; 156/234; 400/490; 428/205; 428/206; 428/332; 428/335; 428/914

[58] Field of Search ................ 427/163; 428/205, 204, 428/335, 332, 206, 914; 156/234; 400/490

[56] References Cited

U.S. PATENT DOCUMENTS

| | | | |
|---|---|---|---|
| 2,536,764 | 1/1951 | Moulton | 427/163 |
| 3,617,354 | 11/1971 | Carnahan et al. | 428/205 X |
| 3,667,983 | 6/1972 | Haggas et al. | 428/205 |
| 3,978,260 | 8/1976 | Dobbins et al. | 428/205 X |

*Primary Examiner*—Thomas J. Herbert

*Attorney, Agent, or Firm*—Browdy and Neimark

[57] ABSTRACT

A key top of a manually operated key, comprising a base member having a top face on which a legend identifying said key is printed, and a transparent protective layer covering at least an area of said top face of the base member in which the legend is disposed. The protective layer is made of a mixture of a transparent base material, and a transparent finely particulate material which is different in refractive index from said base material.

7 Claims, 4 Drawing Figures

FIG. 1
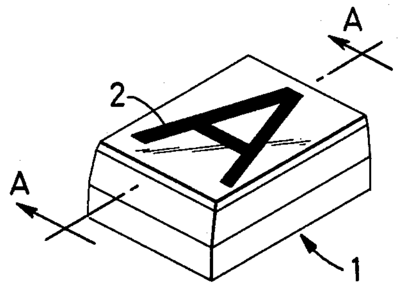
FIG. 2
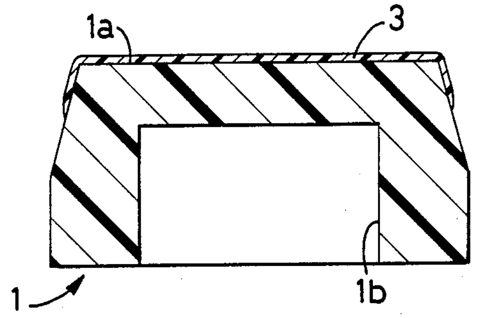
FIG. 3
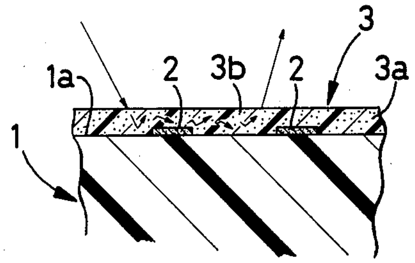
FIG. 4
PLASTIC MOLDING TO FORM A KEY TOP BASE
↓
WASHING MOLDED KEY TOP BASE
↓
TRANSFERRING KEY-IDENTIFYING LEGEND FROM DECALCOMANIA SHEET TO TOP FACE OF KEY TOP BASE
↓
SPRAYING A SOLUTION TO FORM A PROTECTIVE LAYER ON TOP FACE OF KEY TOP BASE
↓
AIR-DRYING (COLD-CURING) SPRAYED PROTECTIVE LAYER
↓
CURING AIR-DRIED PROTECTIVE LAYER AT ELEVATED TEMPERATURE

KEY TOP WITH AN IDENTIFICATION LEGEND

This application is a continuation-in-part of application Ser. No. 585,226, filed 2/28/84, now abandoned.

BACKGROUND OF THE INVENTION

The present invention relates generally to keys disposed on typewriters, electronic desktop calculators and various keyboards provided on or for similar instruments, and more particularly to key tops of such keys having appropriate legends including characters such as symbols, letters and numerals to identify the keys, i.e., to idetify input signals corresponding to the keys.

Key tops of the type indicated above are finger-depressed on their top faces on which the legends are provided. For this reason, the top faces of the key tops are required to provide a high resistance to wear, so that the legends may wear for a long period of service. To meet this requirement, a key top commonly used in the art and generally referred to as "two-color key top" is constructed of a base member which is molded of a plastic material such that the top face has a recessed portion corresponding to a figure of a key-identifying legend. The shaped recess is then filled with a plastic material different in color from the base member, so that the legend is integral with the base member. This two-color key top is excellent in wear resistance of its legend, that is, the legend on the top face may wear for a long time. This advantage, however, accompanies a problem of a high cost of manufacture due to requirements of different molds for forming key tops with different legends. The mold preparation is difficult and costly, particularly where the key top is provided with a complicated legend such as Chinese characters.

Attempts have been made to reduce the manufacturing cost of a key top. For example, a key-identifying legend is provided in a printing process on the top face of a base member of a plastic-molded key top, and the top face with the legend impression is covered with a protective layer excellent in wear resistance and optical transmittance. Such a key top suffers an operational drawback which arises from its high light transmittance (transmission factor), which causes a reduced visibility of the legend and an increased eye fatigue of the key operators due to reflection of light from the top face of the base member.

SUMMARY OF THE INVENTION

It is accordingly an object of the present invention, which was developed in view of the above drawbacks apparent to those experienced in the art, to provide a key top of a key which is simple in construction, economical to manufacture, durable in use with a high wear resistance of its legend, and high in visibility of the legend with minimized eye fatigue of the key operator.

According to the present invention, there is provided a key top of a key, comprising a base member having a top face on which a legend identifying the key is printed. The key top further comprises a transparent protective layer of substantially uniform thickness covering at least an area of the top face of the base member in which the legend is disposed. The protective layer is made of an intimate mixture of a transparent base material, and a mass of fine particles distributed substantially uniformly throughout the entire thickness of the protective layer, that is, a finely particulate material which is high in transparency or degree of clearness and which is different in refractive index from the base material.

In a key top constructed as described above, the protective layer which may be formed at a comparatively low cost, prevents otherwise possible wear of the legend covered therewith, thus enabling the legend to serve for a long period. Further, the use of transparent two materials having different refractive indexes assures high visibility of the legend through the protective layer, and minimum eye fatigue due to otherwise high level of reflected light toward the key operator.

BRIEF DESCRIPTION OF THE DRAWINGS

The above and other objects, features and advantages of the present invention will become more apparent from reading the following description of the preferred embodiment taken in connection with the accompanying drawings in which:

FIG. 1 is a perspective view of an embodiment of a key top of the present invention;

FIG. 2 is an enlarged elevational view in cross section taken along line A—A of FIG. 1;

FIG. 3 is a fragmentary elevational view in cross section of a protective layer provided on the key top of FIGS. 1 and 2; and FIG. 4 is a block diagram showing a process of fabricating the key top.

DETAILED DESCRIPTION OF THE PREFERRED EMBODIMENTS

The invention will be described in more detail referring to the accompanying drawings.

There is shown in FIGS. 1–3 a key top comprising a base member 1 which is molded of a plastic material such as ABS (acrylonitrile-butadiene- and styrene) plastics, so that the base member 1 has a smooth, substantially flat top face 1*a*, and an internal hole 1*b* in which a key stem (not shown) is fitted for fixation to the base member 1. The top face 1*a* carries a legend 2 printed thereon for identifying a key which uses the key top.

The legend 2, which is different in color from the base member 1, is an imprint transferred from a decalcomania sheet onto the top face 1*a* of the base member 1.

The protective layer 3 is made of a base material 3*a*, and a mass of fine particles 3*b*, i.e., finely particulate material 3*b* intimately mixed with the base material 3*a*, as illustrated in FIG. 3. The base material 3*a* is an achromatic acrylic resin excellent in wear resistance and optical transmittance (light transmission factor). The particulate material 3*b* consists of at least one highly transparent, achromatic material which is different in refractive index from the base material 3*a*, and which is selected from a group consisting of: siliceous sand (silica or quartz sand; sand containing particles of quartz as a primary component); silicic acid ($H_4SiO_4$, $H_2SiO_3$, $H_2Si_2O_3$, $H_2Si_2O_5$, $H_6Si_4O_{11}$); anhydrous silica (silicon dioxide, silicic acid anhydride); and calcium carbonate. Due to the difference in refractive index, the fine particles 3*b* serve to cause irregular reflection of an incident light beam, which in turn causes the reflected light beam to pass an increased distance through the protective layer 3 and to be dispersed from the surface of the layer 3 in different directions, thus attenuating the amount of reflected light reaching the eyes of the key operator. In order to give a sufficient wear resistance to the top face 1*a* on which the legend 2 is printed, the protective layer 3 has a thickness of not less than about 50 microns. It is noted that the amount of reflected light beam which passes the protective layer 3 is affected by the content of the particulate material 3b and by the thickness of the protective layer 3. When the particulate material 3b is used in a relative large amount, and/or the protective layer 3 has a comparatively large thickness, there is a tendency that the length of light passage through the protective layer 3 is increased, whereby the light attenuation coefficiency of the protective layer 3 is increased. In other words, the particulate material 3 contributes to reduction in ratio in amount of an incident light beam to the light beam reflected by the top face 1a, and serves to disperse the light from the surface of the protective layer 3, thereby reducing an amount of the light which reaches the eyes of the key operator. This function of the fine particles 3b is considered to be equivalent to such results as if the surface of the protective layer 3 were delustered or flattened. In fact, the fine particles 3b adjacent to the surface of the layer 3 more or less act as a delustering agent to rough or flatten the surface of the protective layer 3.

The key top constructed as described hitherto may be fabricated, for example, in a process which comprises steps as shown in FIG. 4. Stated more specifically, the base member 1 which has been plastic-molded is first washed or degreased to remove an oily substance and other foreign matters attached to its surface. Then, the legend 2 is formed on the top face 1a from a decalcomania sheet. A typical example of such a decalcomania sheet or image transfer sheet is a laminated sheet which consists of: a releasable layer in the form of a tape comprising a substrate of paper or the like containing silicone or wax; a colored image layer containing a pigment as a primary component material and carrying multiple image formers which have a shape corresponding to the legend 2 and are spaced from each other along the length of the substrate; and an adhesive layer made of synthetic rubber as a primary material. For example, the transfer of the legend 2 is effected in the following manner.

At first, the laminated decalcomania sheet is placed over the top face 1a of the base member 1, and heated to about 150°–250° C. by a heating element (not shown) having a surface covered with silicone rubber or other suitable elastic member. Subsequently, the decalcomania sheet is pressed, on the surface of the substrate (releasable layer), against the top face 1a of the base member 1 by the heating element with an optimal force, so that the adhesive layer and the colored image layer are bonded to the top face 1a. Thus, the image former is transferred as the legend 2 onto the top face 1a.

Successively, the top face 1a on which the legend 2 is printed is coated with the protective layer 3 in the following manner. At first, a solution containing the above described materials 3a, 3b is sprayed over the top face 1a. Subsequently, the sprayed materials 3a, 3b are air-dried (cold-cured), and the air-dried layer of the materials is then cured by forced-drying for about 30 minutes at an elevated temperature of about 70° C. Thus, the protective layer 3 is obtained. In this specific example, the above indicated solution for the protective layer 3 is prepared with a relatively high viscosity, so that an amount of the solution necessary to form the protective layer 3 can be obtained by a single spray of the solution.

According to the instant embodiment of a key top, the legend 2 is protected by the protective layer 3 which uses highly wear-resistant acrylic resin as the base material 3a, and consequently may wear for a long period of service. Further, the highly transparent properties of the base and particulate materials 3a and 3b assure high visibility of the legend through the protective layer 3.

Another advantage of the key top of the invention is derived from the difference in refractive index between the base material 3a and the particulate material 3b, which difference results in tendencies of increasing the length of passage of the incident light through the protective layer 3, dispersing the light from the surface of the layer 3 in various directions, and reducing the amount of the reflected light reaching the eyes of the key operator. Further, the fine particles 3b serve to provide the protective layer 3 with a delustering property. All of these effects are combined to minimize the eye fatigue of the key operator.

This single spray method permits formation of the protective layer 3 with a constant thickness and without voids, and is preferred for assuring uniform distribution of the finely particulate material 3b in the direction of thickness of the protective layer 3.

What is claimed is:

1. A key top of a key, comprising:

a base member having a top face on which a legend identifying said key is printed;

a transparent protective layer of substantially uniform thickness covering at least an area of said top face of the base member in which said legend is disposed, said protective layer being made of a mixture of a transparent base material, and a transparent finely particulate material of visible-light reflecting size mixed with said transparent base material, said finely particulate material being different in refractive index from said base material and having a substantially uniform distribution throughout entire thickness of said protective layer.

2. A key top as recited in claim 1, wherein said base material of the protective layer consists of an achromatic synthetic resin.

3. A key top as recited in claim 1, wherein said base material of the protective layer consists of an achromatic acrylic resin.

4. A key top as recited in claim 1, wherein said finely particulate material is at least one achromatic material selected from a group consisting of silica sand, silicic acid, anhydrous silica and calcium carbonate.

5. A key top as recited in claim 1, wherein said legend consists of an imprint of a color different from that of said top face, said imprint being transferred from a decalcomania sheet carrying an image of said legend.

6. A key top as recited in claim 1, wherein said protective layer has a thickness of not less than 50 microns.

7. The key top of claim 1, wherein said transparent finely particulate material is intimately mixed with said transparent base material.

* * * * *